April 18, 1967   C. C. ANTHES ET AL   3,314,612
CONSTANT PRESSURE SERIES OF OXY-FUEL CUTTING NOZZLES
Filed Oct. 21, 1964
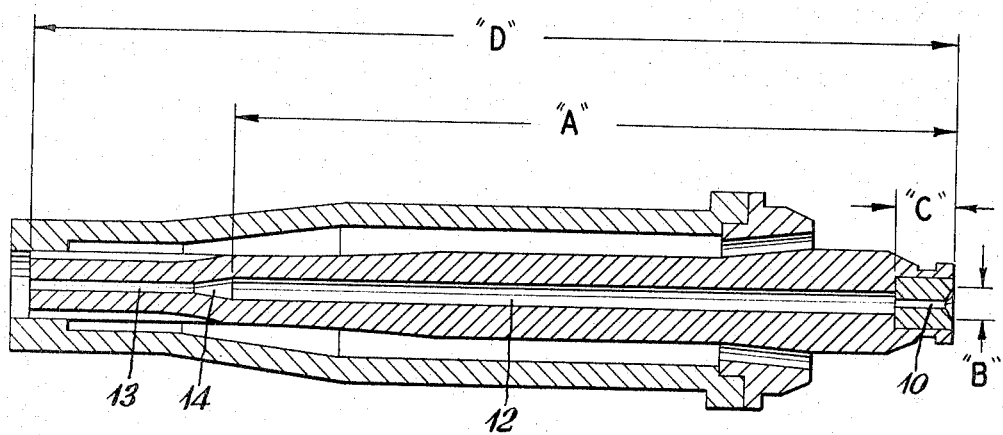
INVENTORS
CLIFFORD C. ANTHES
EDWARD MEINCKE
JOHN VILLORESI
BY Richard S. Shreve Jr.
ATTORNEY

United States Patent Office 3,314,612
Patented Apr. 18, 1967

3,314,612
CONSTANT PRESSURE SERIES OF OXY-FUEL CUTTING NOZZLES
Clifford C. Anthes, Union, Edward Meincke, Summit, and John Villoresi, Lincoln Park, N.J., assignors to Union Carbide Corporation, a corporation of New York
Filed Oct. 21, 1964, Ser. No. 407,270
2 Claims. (Cl. 239—589)

This is a continuation-in-part of Serial No. 101,805, filed April 10, 1961.

This invention relates to a constant pressure series of non-diverging cylindrical bore oxy-fuel cutting nozzles for selective use in a nozzle holder, and more particularly to a series of this character which is effective in cutting metal stock having a wide range of thicknesses, when supplied with oxygen at the same pressure. Non-diverging cylindrical bore nozzles are most commonly used in hand cutting operations as contrasted with divergent bore nozzles which are used almost exclusively in machine cutting where the slag spatter normally produced thereby can be tolerated.

It has been widely recognized that there is an optimum volume flow of cutting oxygen for cutting each thickness of metal. Thus, the most efficient and economical oxygen cutting operations are obtained by having the diameter of the nozzle cutting oxygen bore tailored to the particular metal thickness to be cut. Therefore, it has become common practice with producers of oxygen cutting torches to supply cutting nozzles in series form. Such a series of nozzles, containing anywhere from 6 to 12 nozzle sizes, will include for example starting with the smallest size, a nozzle having a .020" diameter cutting oxygen bore for cutting up to 1/8" material, a nozzle having a .037" diameter cutting oxygen bore for cutting up to 1/2" material, etc., up to the largest size nozzle having a .144" diameter cutting oxygen bore for cutting up to 12" material. For each size of cutting oxygen bore of course a suitable oxygen operating pressure must be employed for delivering the required oxygen to the nozzle discharge orifice. In non-diverging cylindrical bore nozzles, these oxygen pressures will vary over a wide range, e.g. from 30 p.s.i. for the smallest sizes up to 100 p.s.i. or more for the largest sizes, whereas a divergent bore series will operate effectively over a much narrower pressure range. Thus, in order for the operator to obtain the optimum in cut quality and economy as to oxygen consumption, it is necessary for him to combine the proper size nozzle with the proper oxygen pressure for the particular material thickness to be cut.

Tables of recommended operating pressures are generally supplied with each cutting torch. Unfortunately, they are not always available when needed by the operator and, even when available, entail some inconvenience in referring to them. As a result, it has become common practice for the operator to rely on his own judgment and experience in setting his cutting oxygen pressures. Much waste, as well as a loss in cut quality, due to the use of excessive and unsuitable pressures has resulted.

The most desirable solution to this problem, and the one provided by this invention, is to have a whole series of non-divergent cylindrical bore nozzles, from the smallest size for cutting 1/8" material to the largest size for cutting up to 12" material, operate on one basic cutting oxygen pressure. Combine this with a metal thickness designation marked on each nozzle indicating the metal thickness that particular nozzle cutting oxygen bore has been tailored to cut, and the so-called art is taken out of oxygen cutting operations. Even the most inexperienced operator, merely by selecting the nozzle of the series of the invention bearing the proper metal thickness designation and setting his cutting oxygen pressure to the one basic value, can obtain high quality cuts with kerfs, of minimum width, having smooth, vertical wall faces.

In addition, we have found that the variation, from the smaller sizes to the larger sizes of nozzles, in the Q/A value of the cutting oxygen stream, which characterizes conventional cutting nozzle series, is a serious deterrent to achieving the optimum in cut quality and cutting speed for all thicknesses of material. (The Q/A value referred to herein is a design reference utilized to establish the port size for a given oxygen flow according to the well-known formula $V=Q/A$ wherein V is the design reference number, Q denotes quantity of gas in cubic feet per hour, and A is the cross-sectional area in square inches of the port through which the measured fluid passes.) The Q/A value for most conventional nozzle series varies over a range of anywhere from 25,000 to 100,000.

We have found that a Q/A value for the cutting oxygen jet or stream of approximately 52,000 (45,000 to 60,000), maintained constant for all sizes of nozzles, provides the optimum in cut quality and cutting speed for all thicknesses of material. If the Q/A value is above 60,000, the resulting over expansion of the oxygen stream as it emerges from the cutting oxygen port causes waves or nodes to be formed in the kerf walls. Thus, the desired uniformly smooth kerf walls are not obtained. If the Q/A value is less than 45,000 the result is a kerf which tends to undesirably converge or narrow down at the bottom. Thus, the kerf walls will not be straight, that is, perpendicular to the top surface of the metal plate being cut.

According to the present invention, a series of non-diverging cylindrical bore oxy-fuel cutting nozzles are provided for selective use in a nozzle holder. This series of nozzles is capable of effectively cutting metal stock having a wide range of metal thicknesses when supplied with oxygen at the same pressure. The range referred to is substantially larger than was heretofore possible using prior art nozzle series. Each tip of the series has a non-diverging cylindrical discharge passage which is sized to deliver the required oxygen flow for a given narrow range of metal thickness at a Q/A value of between 45,000 and 60,000 ft.$^3$/hr. x in.$^2$. Each tip of the series also has an intermediate passage having a converging tapered portion for delivering oxygen into the discharge passage. Preferably, the diameter of the intermediate passage is at least one and a half times the diameter of the discharge passage. Also, the tapered portion should preferably form an included angle of the order of 15°. Finally, each tip of the series has a metering orifice upstream of the intermediate passage. The metering orifice has a smaller diameter than the intermediate passage to effect a fixed pressure drop. The diameter of the discharge passage of each tip in the series is increased over the next smaller tip to provide the optimum flow conditions for a narrow metal thickness range, and the diameter of the metering orifice of each tip in the series is also increased in proportion to the increment of the corresponding discharge passage to provide nozzles to effectively cut increased thicknesses of metal stock at one fixed supply pressure. Preferably, each metering orifice should have a length to diameter ratio of between 2½ to 1 and 3 to 1.

Each nozzle thus cooperates with one or more other nozzles having similarly arranged passages and adapted for installation on the same blowpipe body, to form a set of interchangeable nozzles. Each nozzle of the set will cut a different narrow range of metal thickness at the same oxygen supply pressure, and will do so with optimum effectiveness. The metering orifice of each nozzle in the set is sized so as to deliver the optimum oxygen flow through its respective nozzle discharge port when the nozzle inlet is supplied with oxygen at a pressure equal to that which is supplied to the other nozzle or nozzles of the set.

In the design of the nozzle series of the invention, basically we have combined: (a) a cutting oxygen port tailored to deliver the required cutting oxygen flow for a given narrow range of metal thicknesses at a constant Q/A value of approximately 52,000; (b) a metering orifice upstream of the cutting oxygen port so sized with respect to the cutting oxygen port that the whole series of nozzles operates on one basic cutting oxygen pressure; and (c) a cutting oxygen passage design that results in an issuing oxygen stream that maintains its cylindrical shape and diameter for a significant distance beyond the end of the nozzle. Thus, we have not only taken the so-called art out of oxygen cutting operations, but further have ensured the achievement of consistently good quality, high speed cuts with kerfs of minimum width having uniformly smooth, vertical walls.

The single figure of the drawing is a longitudinal cross section through a nozzle showing the characteristics of the cutting oxygen passage of the series according to the present invention.

The cutting oxygen passage comprises metering orifice 10, intermediate portion 12, and cylindrical cutting oxygen port 13, with a converging taper 14 of 15 degrees included angle as the transition from intermediate portion 12 to port 13.

The ideal cutting nozzle series of course would include a nozzle in the series for every thickness of metal to be cut. In this way, the cutting oxygen bore could be tailored exactly as to volume flow of oxygen to suit the metal thickness. From an operating, as well as manufacturing standpoint, this is obviously impractical. We have found that good quality, economical oxygen cutting can be performed on metal ranging in thickness from $\frac{1}{16}''$ to $12''$, using a nozzle series containing 12 sizes.

The following table lists the 12 nozzle sizes representative of the nozzle series of the invention together with the metal thickness range each size nozzle is designed to cut and the optimum cutting oxygen flow for each metal thickness range.

In designing a series of nozzles which will (a) all operate from a single constant cutting oxygen head pressure and (b) provide the optimum volume flow of cutting oxygen for the particular metal thickness range of each nozzle of the series at a Q/A value of approximately 52,000, it is necessary first to select the proper cutting oxygen port size for each nozzle and then combine this according to a predetermined relationship with a metering orifice located in the inlet of the nozzle cutting oxygen passage.

Knowing the optimum cutting oxygen flow and the desired Q/A value, it is a simple matter to determine the proper cutting oxygen port size using the equation (1) $$V = Q/A$$

To establish the corresponding metering orifice size, it is first necessary to decide what constant cutting oxygen head pressure is to be used. In designing the nozzle series depicted in the foregoing table, 65 p.s.i. was chosen as the constant cutting oxygen head pressure for three reasons:

(1) It was found to be a high enough pressure to cut all thicknesses of metal up to 12 inches.

(2) It is a sufficiently high pressure to permit the use of divergent bore nozzles for increased cutting speed should it be so desired.

(3) It is a pressure not in excess of the pressure available from the new LC-3 type liquid oxygen cylinder supply.

A second factor to be taken into consideration in establishing the upstream metering orifice size is the discharge coefficient of the downstream oxygen port. Where two orifices are used in series, the discharge coefficient of the downstream orifice has a marked effect on the selection of the proper size of the upstream orifice in order to achieve proper flow at the predetermined head pressure at the inlet of the first orifice. Therefore, in establishing the upstream metering orifice size, it is necessary to know what the discharge coefficient is in the downstream orifice. The various factors which collectively determine this discharge coefficient, according to well-known fluid flow theory, include:

| Nozzle Size | Metal Thickness Range, in. | Cutting O₂ Flow, c.f.h. | Cutting O₂ Port 13, dia.-in. | Intermediate Portion 12, dia.-in. | Metering Orifice 10, dia.-in. | Dimension "A", inches | Dimension "C", inch | Dimension "C", inch | Dimension "D", inches |
|---|---|---|---|---|---|---|---|---|---|
| ¼ | Up to 3/16 | 16 | .0200 | .082 | .0180 | 2.883 | 5/64 | .250 | 3.304 |
| ½ | ¼ to ¾ | 56 | .0370 | .082 | .0330 | 2.883 | 3/32 | .250 | 3.304 |
| 1 | ¾ to 1¼ | 92 | .0492 | .082 | .0400 | 2.525 | 7/64 | .250 | 3.304 |
| 1½ | 1¼ to 1¾ | 147 | .0595 | .125 | .0465 | 2.525 | 5/32 | .250 | 3.304 |
| 2 | 1¾ to 2½ | 189 | .0670 | .125 | .0550 | 2.525 | 5/32 | .250 | 3.304 |
| 3 | 2½ to 3½ | 262 | .0810 | .1406 | .0595 | 2.336 | 5/32 | .250 | 3.304 |
| 4 | 3½ to 4½ | 331 | .0890 | .1406 | .0730 | 2.336 | 3/16 | .265 | 3.304 |
| 5 | 4½ to 5½ | 408 | .0995 | .1406 | .0810 | 2.336 | 3/16 | .296 | 3.304 |
| 6 | 5½ to 7 | 476 | .1040 | .187 | .0890 | 2.336 | 3/16 | .328 | 3.304 |
| 8 | 7 to 9 | 590 | .1200 | .187 | .0960 | 2.101 | 3/16 | .359 | 3.304 |
| 10 | 9 to 11 | 745 | .1360 | .187 |  | 2.101 |  |  | 3.304 |
| 12 | 11 to 12 | 860 | .1440 | .187 |  | 1.883 |  |  | 3.304 |

Until recent years, the cost of oxygen was the controlling factor in determining the optimum volume flow of oxygen for a particular cutting application and oxygen consumption was kept as low as possible commensurate with good cut quality. Now, however, with labor costs becoming the largest single cost factor, cutting speed has become the dominant consideration. Thus, for the most economical cutting operations, the cutting oxygen flow requirements for each metal thickness are desirably based on that volume flow of cutting oxygen which provides the fastest cutting speeds commensurate with good cut quality and narrow kerfs. The cutting oxygen flow figures given in the foregoing table represent what we have found to be the optimum flows for cutting the indicated metal thicknesses.

(1) The ratio of the diameter of the approach bore to that of the downstream orifice, which should be at least 1½ to 1. (Ratio of bore 12 to discharge port 13 as shown in the drawing.)

(2) The form of the transition from the approach bore to the orifice. That is, the approach to the orifice may be sharp-edged, tapered or rounded. (As shown in the drawing, we use a 15° included taper 14 as our approach to the oxygen port 13.)

(3) The length of the orifice.

(4) The smoothness of the walls of the approach bore and the orifice.

These factors will, of course, be established by the oxygen passage design and method of manufacture selected. The coefficient of discharge for the particular oxygen passage design utilized in the nozzle series of the invention is approximately 0.9.

Knowing the discharge coefficient of the downstream oxygen port or orifice and the area of this port, the known critical flow equation for oxygen (2)  $\quad Q = 1057 \times A \times P_1 \times \varphi$ is used to determine the absolute upstream pressure $P_1'$ needed to obtain the desired flow. (The critical flow equation is used because in order to achieve the desired high Q/A of 52,000, critical flow is required.) In this equation: Q is the optimum cutting oxygen flow in cubic feet per hour of formula (1); A is the area in square inches of the downstream oxygen port; and $\varphi$ is the coefficient of discharge of the downstream oxygen port. The absolute upstream pressure $P_1'$ from Equation 2 will also be the absolute downstream pressure $P_2$ on the metering orifice.

Now, using the known non-critical flow equation for oxygen (3) $\quad Q = 4070 \times A' \times P_2 \times \varphi' \times \sqrt{\left(\frac{P_1}{P_2}\right)^{.286}\left[\left(\frac{P_1}{P_2}\right)-1\right]^{.286}}$ wherein $Q$ = the optimum cutting oxygen flow in cubic feet per hour as used in Equations 1 and 2
$P_2 = P_1'$ of Equation 2
$P_1$ = constant cutting oxygen head pressure absolute
$\varphi'$ = discharge coefficient of the metering orifice the area $A'$ of the metering orifice may be derived. The discharge coefficient $\varphi'$, similarly to the discharge coefficient of the oxygen port above, is a matter of design and can be selected as desired.

For example, the oxygen port 13 and metering orifice 10 of the Size 1 nozzle of the foregoing table according to the invention was derived as follows:

(a) Optimum cutting oxygen flow Q for ¾" to 1¼" material = 92 c.f.h.
(b) Constant cutting oxygen head pressure = 65 p.s.i.
(c) Desired $Q/A = 52,000$
(d) Using $V = Q/A$ or $52,000 = 92/A$ $$A = \frac{92}{52,000} = .00176 \text{ sq. in. area}$$

The closest drill size to providing a .00176 sq. in. area is 1.25 mm. with a .0492" dia., or an area of .001897 sq. in. (The actual Q/A value is, thus, $$Q/A = \frac{92}{.001897} = 48,500)$$

(e) Using Equation 2 $Q = 1057 \times A \times P_1' \times \phi$ and an oxygen port design having a discharge coefficient = .9 to solve for $P_1'$ $$P_1' = \frac{92}{1057 \times .001897 \times .9}$$

$P_1' = 50.9$ p.s.i. absolute or 36.2 p.s.i. gauge (f) Using Equation 3

$$Q = 4070 \times A' \times P_2 \times \varphi' \times \sqrt{\left(\frac{P_1}{P_2}\right)^{.286}\left[\left(\frac{P_1}{P_2}\right)-1\right]^{.286}}$$

and a metering port design having a discharge coefficient $\varphi' = 0.9$ and solving for $A'$ $$A' = \frac{92}{4070 \times 50.9 \times .9 \times \sqrt{\left(\frac{79.7}{50.9}\right)^{.286}\left[\left(\frac{79.7}{50.9}\right)-1\right]^{.286}}}$$

$A' = .001253$ sq. in.

The closest drill is a No. 60 having a .040" dia. and an area of .001257 sq. in.

The combination of Equations 1, 2, and 3 in the manner described above thus provides a means of determining the proper combination of a metering orifice and cutting oxygen port for each nozzle of a series which permits operation of the entire series on one basic cutting oxygen head pressure to supply from each nozzle the optimum cutting oxygen flow at the optimum Q/A value for cutting a particular metal thickness range.

However, while the proper relationship between the metering orifice and oxygen port sizes is of vital importance in the design of the nozzle series of the invention, other features incorporated into the oxygen passage of these nozzles have a significant bearing on the high quality and economy of the cutting operations performed therewith.

While the cutting speed and the volume of oxygen consumed are the more significant factors, the metal loss due to the width of the kerf, nevertheless, constitutes an important part of the cost of any cutting operation. Thus, keeping the kerf width to a minimum commensurate with the thickness of metal being cut is a desirable contribution to the economy of oxygen cutting applications.

The minimum kerf widths achieved with the nozzles of the invention are due to the fact that the oxygen stream issuing from the oxygen ports maintains its cylindrical shape and diameter for a greater distance from the end of the nozzle than is true with conventional nozzles. That is, the coherence of the oxygen stream is maintained for a longer travel distance rather than its being broken up due to turbulence and/or lateral expansion almost immediately upon exiting from the oxygen port. Thus, the kerf width which is governed by the diameter and shape of the oxygen stream, is kept to a minimum.

In addition, this coherence of the oxygen stream permits utilization of the maximum quantity of kinetic energy available in the oxygen stream at the point of cutting instead of having a substantial part of this energy dissipated through turbulence and lateral expansion. Thus, the efficiency of the cutting operation is increased.

The fact that the oxygen stream issuing from the oxygen port of the nozzle of the invention maintains its cylindrical shape and diameter and is not disrupted by turbulence and lateral expansion is due to the particular combination of design features incorporated into the oxygen passage of the nozzle.

(1) A metering orifice 10 having a length to diameter ratio of 2½ up to 3 to 1.

(2) An intermediate portion 12 having a length to diameter ratio as large as possible.

(3) A tapered transition section 14 between the intermediate portion 12 and the oxygen port 13. An included taper of approximately 15° is preferred in order to achieve a high discharge coefficient (0.9) for the oxygen port 13.

The combination of the above has been found to result in an oxygen flow pattern having the evenness and smoothness approaching that of streamlined or laminar flow with a minimum of turbulence.

What is claimed is:

1. A non-diverging cylindrical bore blowpipe nozzle, which is correlated in size with one or more other nozzles having similarly arranged passages and adapted for installation on the same blowpipe body, to form a set of interchangeable nozzles, each adapted to cut a different narrow range of metal thickness, said nozzle having a cylindrical cutting oxygen discharge port adapted to deliver a cutting oxygen flow for a narrow range of metal thickness at a constant Q/A value of 45,000 to 52,000 ft.³/hr. per square inch of discharge port cross section, an intermediate passage of a diameter at least one and a half times the diameter of said discharge port and having a converging portion leading into said discharge port, and a metering orifice of smaller diameter than said intermediate passage connecting the nozzle inlet with said passage, said metering orifice being sized to deliver said oxygen flow through said discharge port when said nozzle inlet is supplied with oxygen at a predetermined fixed pressure.

2. A blowpipe nozzle comprising a cylindrical non-diverging discharge passage, an intermediate passage having a converging portion leading into said discharge passage, and a metering orifice of smaller diameter than said intermediate passage connecting the nozzle inlet with said intermediate passage, said metering orifice being sized to deliver a flow of between 45,000 to 52,000 ft.$^3$/hr. per square inch of discharge passage cross section to said intermediate passage, at a given supply pressure.

References Cited by the Examiner

UNITED STATES PATENTS

| | | | |
|---|---|---|---|
| 1,097,263 | 5/1914 | Reich | 239—419 |
| 1,602,320 | 10/1926 | Bastions. | |
| 1,850,379 | 3/1932 | Campbell | 239—419 |
| 1,958,741 | 5/1934 | Campbell | 239—419 |
| 2,638,159 | 5/1953 | Winkelman et al. | 239—423 |
| 2,861,900 | 11/1958 | Smith et al. | |

FOREIGN PATENTS

| | | |
|---|---|---|
| 420,583 | 8/1953 | Canada. |
| 820,578 | 8/1937 | France. |

OTHER REFERENCES

Acetogan Gas Catalog, Copyright 1956 by the Acetogen Gas. Co., 20137 Sherwood St., Detroit 34, Mich.—pages 24–27 cited.

EVERETT W. KIRBY, *Primary Examiner.*